United States Patent [19]

Yuki

[11] 4,046,709

[45] Sept. 6, 1977

[54] METHOD OF MANUFACTURING CARBONACEOUS GRANULAR MOLECULAR SIEVE

[75] Inventor: Nakaji Yuki, Kawaguchi, Japan

[73] Assignee: Director-General of the Agency of Industrial Science and Technology, Tokyo, Japan

[21] Appl. No.: 561,164

[22] Filed: Mar. 24, 1975

[51] Int. Cl.[2] .......................... B01J 37/00; B01J 21/18; C01B 31/00

[52] U.S. Cl. .................................... 252/421; 252/444; 252/445; 423/445; 423/449; 264/29.3

[58] Field of Search ....................... 252/421, 444, 445; 423/445, 449; 264/29

[56] References Cited

U.S. PATENT DOCUMENTS

| | | | |
|---|---|---|---|
| 2,008,145 | 7/1935 | Morrell | 252/3 |
| 2,648,637 | 8/1953 | Rodman, Jr. | 252/421 |
| 2,934,417 | 1/1976 | Wolfe et al. | 252/445 X |
| 2,944,031 | 7/1960 | Mason | 252/421 |
| 3,258,363 | 6/1966 | Lieb | 423/449 |
| 3,395,094 | 7/1968 | Weisz | 208/62 |
| 3,852,429 | 12/1974 | Murayama et al. | 423/445 |
| 3,891,574 | 6/1975 | Kobayashi et al. | 252/421 |
| 3,960,768 | 6/1976 | Ripperger et al. | 252/421 X |

*Primary Examiner*—Patrick P. Garvin
*Assistant Examiner*—William G. Wright
*Attorney, Agent, or Firm*—William J. Daniel

[57] ABSTRACT

Granular molecular sieve may be obtained, without necessitating any activating treatment, by subjecting a vinylidene chloride copolymer to a thermal carbonization treatment for removal of hydrochloric acid, pulverizing the resultant product to a grain size smaller than 100 mesh size, adding 15 to 35 parts by weight of a carbonaceous sintering agent and 8 to 15 parts by weight of an organic pelletizer capable of gas generation by heating to 100 parts by weight of the pulverized product, pelletizing the resultant mixture and carbonizing the resultant pellets at a temperature of 400 to 900° C for a period of 2 to 6 hours. The pore diameter of this molecular sieve can be suitably controlled within a range of from 5 to 10 A by appropriately selecting the sintering agent and pelletizer employed and the conditions of the thermal treatment.

5 Claims, No Drawings

METHOD OF MANUFACTURING CARBONACEOUS GRANULAR MOLECULAR SIEVE

BACKGROUND OF THE INVENTION

This invention relates to a method of manufacturing carbonaceous granular molecular sieve. More particularly, the invention relates to a method of manufacturing carbonaceous granular molecular sieve from a vinylidene chloride copolymer without necessitating any activating treatment.

Heretofore, molecular sieves consisting of zeolite have chiefly been used for the separation and refinement of gases. The zeolite molecular sieve, however, lacks in chemical resistance and its selective adsorption capacity deteriorates at high temperatures. Besides the above, it is also expensive. Therefore, it is not suitable for employment on an industrial scale.

Molecular sieve materials obtainable by sintering certain carbonaceous materials followed by activating treatment are also known in the art. Such carbonaceous molecular sieve, however, is inadequate for continuous use for a long period of time because of its low mechanical strength.

The industries dealing with gases have accordingly been calling for a molecular sieve material, which has sufficient chemical resistance and mechanical strength while having excellent selective adsorption capacity with respect to different gases.

BRIEF SUMMARY OF THE INVENTION

It is an object of the present invention to provide a method of inexpensively manufacturing a molecular sieve, which has sufficient chemical resistance and mechanical strength while having excellent adsorption capacity with respect to different gases.

It is another object of the present invention to provide a method of manufacturing a molecular sieve having excellent properties from plastic waste products through a simple process.

It is a further object of the present invention to provide a novel carbonaceous molecular sieve having pore diameters ranging from 3 to 10 A.

Further objects, features and advantages of the present invention will become apparent from the following description.

DETAILED DESCRIPTION OF THE INVENTION

According to the invention, a carbonaceous granular molecular sieve having a high chemical resistance and excellent mechanical strength at high temperatures can be obtained by subjecting a vinylidene chloride copolymer to a thermal carbonization treatment for removal of hydrochloric acid, pulverizing the resultant product to a grain size smaller than 100 mesh size, adding 15 to 35 parts by weight, preferably 20 to 30 parts by weight, of a carbonaceous sintering agent and 8 to 15 parts by weight, preferably 10 to 12 parts by weight, of an organic pelletizer, which is capable of thermal gas generation, to 100 parts by weight of the crushed product, pelletizing the mixture and subjecting the resultant pellets to a thermal carbonization treatment at a temperature of 400° to 900° C for a period of 2 to 6 hours.

In accordance with the present invention, as the vinylidene chloride, a copolymer of vinylidene chloride and vinyl chloride and also copolymers of vinylidene chloride and olefins may be used and the vinylidene chloride content of the copolymer is preferably within a range of from 40 to 95 percent by weight. It is possible to use, as the vinylidene chloride copolymer, recovered waste products of plastics, for example, that of Saran (Tradename of Dow Chemical Co., U.S.A.).

This vinylidene chloride copolymer is first thermally carbonized at a temperature of 500° to 700° C for 1 to 5 hours and then cooled and pulverized to a grain size smaller than 100 mesh size.

As the carbonaceous sintering agent, a carbonaceous material, derived from petroleum or coal and capable of being fused to exhibit viscosity when heated, for instance coal tar pitch, asphalt and caking coal, may be used. It is also pulverized to a grain size smaller than 100 mesh size for use. As the organic pelletizer, a tenacious organic substance, which can be partially gasified when heated with the remaining ungasified portion becoming carbonized, for example, crystalline cellulose solution, waste treacle, sulfite waste liquor, etc., may be used.

The sintering agent and pelletizer are added within respective ranges of 15 to 35 percent by weight and 8 to 15 percent by weight with respect to the vinylidene chloride copolymer product powder with hydrochloric acid removed therefrom. If the proportion of the sintering agent is less than 15 weight percent, the mechanical strength of the resultant molecular sieve will be extremely reduced. On the other hand, if the proportion is greater than 35 weight percent, resultant pellets will adhere to one another at the time of the subsequent carbonization so that the uniformity of quality of the product will be lost. If the proportion of the pelletizer is less than 8 weight percent, the resultant pellets will display low mechanical strength at normal temperature, so that they will tend to collapse and become finer particles at the time of carbonization treatment. On the other hand, with a proportion greater than 15 weight percent, such inconvenience as difficulty to pelletize to a given grain size or adhesion to the pelletizer during the pelletizing step would be encountered. Generally, with the increase of the quantity of the pelletizer, the pore diameter of the resultant molecular sieve is increased while the mechanical strength thereof is reduced.

In the method according to the present invention, the mixture of the hydrochloric acid removal treatment product powder of vinylidene chloride copolymer, sintering agent and pelletizer is pelletized, for example, into pellets with a diameter of 2 millimeters and a thickness of 0.5 to 1 millimeter, followed by thermal carbonization in a carbonizing furnace at a temperature ranging from 400 to 900° C for a period of 2 to 6 hours. If the carbonizing temperature at this time is lower than 400° C, sufficient gasification of the pelletizer contained in the pellets will not be obtained, so that neither perfect microporous structure nor sufficient mechanical strength can be obtained. On the other hand, increasing the carbonizing temperature over 900° C will not lead to any added advantage with respect to the properties of the resultant molecular sieve, but it will merely lead to an increase in the equipment costs. If the carbonizing period is shorter than 2 hours, the gasifying effect of the sintering agent and pelletizer is again insufficient, so that the development of the microporous structure of the pellets will be insufficient. Also, the congealing effect is insufficient, so that the mechanical strength of the product will be low. Extending the carbonizing period in excess of 6 hours, on the other hand, will not lead to any pronounced effect. The carbonizing period may be suitably curtailed by appropriately increasing the carbonizing temperature. Generally, within the range of 400° to 900° C, the lower the carbonizing temperature, the smaller the pore diameter of the molecular sieve and by increasing the carbonizing temperature, a molecular sieve having increased pore diameter may be obtained.

It will be appreciated that according to the present invention, it is possible to control the pore diameter of the molecular sieve, practically within a range of from 5 to 10 A, by appropriately selecting the sintering agent and pelletizer and the conditions for thermally treating the pellets.

In the step of carbonizing the pellets according to the present invention, the sintering agent and pelletizer contained in the pellets are thought to provide congealing effect as well as gas generation effect for the formation of the microporous structure of the pellets.

The molecular sieve obtainable according to the present invention, unlike the prior art carbonaceous molecular sieve, requires no subsequent activating treatment and can be used in situ.

The present invention will be understood more readily by reference to the following examples, which, however, are intended to illustrate the invention and should not be construed as limiting the scope of the invention.

EXAMPLE 1

The recovered waste product of Saran (vinylidene chloridevinyl chloride copolymer, manufactured by Asahi Dow Co., Japan) was carbonized in a carbonizing furnace at 600° C for 2 hours, followed by cooling and pulverizing to a grain size smaller than 100 mesh. To 100 parts by weight of the pulverized product was added 30 parts by weight of coal tar pitch and the resultant system was sufficiently agitated at 120° C. To the resultant mixture was then added 10 parts by weight of Avicel (crystalline cellulose, manufactured by Asahi Kasei Co., Japan), followed by sufficient agitation. The resultant admixture was then pelletized by using a desk pelletizer and sprinkling a small quantity of water into pellets having a diameter of 1 millimeter and a thickness of 1 millimeter. The pellets thus formed were then carbonized in a rotary kiln at a temperature of 400° C for 6 hours to produce a carbonaceous granular molecular sieve with a yield of 85 percent.

Table 1 below shows the results of measurements of the adsorption capacity of this carbonaceous granular molecular sieve and a commercially available comparison molecular sieve (Molecular Sieve 3A) with respect to carbon dioxide (with the minimum molecular diameter of 3.4 A) and methane (with the minimum molecular diameter of 4.0 A), the measurements being conducted in the ordinary manner under different pressures.

Table 1

Adsorption capacity (in mg/g) with respect to $CO_2$ and $CH_4$

| Adsorbed material Pressure | Molecular sieve present invention | | Molecular sieve commercially available | |
|---|---|---|---|---|
| (mm Hg) | $CO_2$ | $CH_4$ | $CO_2$ | $CH_4$ |
| 50 | 20 | 0 | 10 | 0 |
| 100 | 30 | 0 | 18 | 0 |
| 200 | 43 | 0 | 29 | 0 |
| 300 | 49 | 0 | 36 | 0 |
| 400 | 53 | 0 | 42 | 0 |
| 500 | 57 | 0 | 47 | 0 |
| 700 | 61 | 0 | 58 | 0 |

As is apparent from the Table, neither product according to the present invention nor the comparison product exhibits adsorption effect with respect to methane whatsoever. This means that neither of these products has pores greater than 4 A. In the absorption capacity with respect to carbon dioxide, the product according to the present invention is slightly superior to the commercially available product.

EXAMPLE 2

Pellets prepared in the same manner as in Example 1 were carbonated in a rotary kiln at 800° C for 2 hours to obtain a carbonaceous granular molecular sieve with a yield of 60.6 percent.

Table 2 below shows the results of measurements of the adsorption capacity of the molecular sieve thus obtained and a commercially available molecular sieve (Molecular sieve 5A) with respect to carbon dioxide and n-butane (with the minimum molecular diameter of 4.3 A), the measurements being conducted at 25° C and under different pressures.

Table 2

Adsorption capacity (in mg/g) with respect to $CO_2$ and n-butane

| Adsorbed material Pressue | Molecular sieve present invention | | Molecular sieve commercially available | |
|---|---|---|---|---|
| (mm Hg) | $CO_2$ | n-butane | $CO_2$ | n-butane |
| 50 | 20 | 96 | 59 | 80 |
| 100 | 40 | 108 | 80 | 83 |
| 200 | 59 | 114 | 93 | 85 |
| 300 | 72 | 116 | 97 | 87 |
| 400 | 84 | 117 | 98 | 89 |
| 500 | 95 | 119 | 98 | 90 |
| 600 | 103 | 119 | 99 | 91 |
| 700 | 108 | 120 | 100 | 92 |

As is seen from the above Table 2, the adsorption capacity of the product according to the present invention with respect to n-butane, is about 1.5 times that of the commercially available product.

Similar measurements of the adsorption capacity with respect to isobutane (with the minimum molecular diameter of 5.0 A) revealed that no adsorption was exhibited by either product according to this invention or the commercially available product. This means that neither of these products has pores greater than 5 A whatsoever.

EXAMPLE 3

Pellets prepared in the same manner as in Example 1 were carbonized in a rotary kiln at 900° C for 2 hours to obtain carbonaceous granular molecular sieve with a yield of 58.5 percent.

Table 3 below shows the results of measurements of the adsorption capacity of the molecular sieve thus obtained and a commercially available molecular sieve (Molecular sieve 5A) with respect to carbon dioxide and n-butane, the measurements being conducted at 25° C and under different pressures.

Table 3

Adsorption capacity (in mg/g) with respect to $CO_2$ and n-butane

| Adsorbed material Pressure | Molecular sieve present invention | | Molecular sieve commercially available | |
|---|---|---|---|---|
| (mm Hg) | $CO_2$ | n-butane | $CO_2$ | n-butane |
| 50 | 23 | 170 | 58 | 80 |
| 100 | 35 | 179 | 80 | 83 |
| 200 | 53 | 189 | 91 | 85 |

Table 3-continued

| Adsorbed material Pressure (mm Hg) | Adsorption capacity (in mg/g) with respect to $CO_2$ and n-butane | | | |
|---|---|---|---|---|
| | Molecular sieve present invention | | Molecular sieve commercially available | |
| | $CO_2$ | n-butane | $CO_2$ | n-butane |
| 300 | 71 | 192 | 98 | 88 |
| 400 | 83 | 197 | 99 | 91 |
| 500 | 92 | 201 | 100 | 92 |
| 600 | 100 | 204 | 101 | 95 |
| 700 | 106 | 205 | 101 | 96 |

As is seen from the above Table 3, the adsorption capacity of the product according to the present invention with respect to n-butane, is about 1.5 times that of the commercially available product.

Similar measurements of the adsorption capacity with respect to isobutane (with the minimum molecular diameter of 5.0 A) revealed that no adsorption was exhibited by either product according to the present invention or the commercially available product. This means that neither of these products has pores greater than 5 A whatsoever.

EXAMPLE 4

The recovered Saran waste product was carbonized in a carbonizing furnace at a temperature of 600° C for 2 hours, followed by cooling and pulverizing to a grain size smaller than 100 mesh. To 100 parts by weight of the resultant pulverized product were added 30 parts by weight of caking coal having a 200 mesh size as sintering agent and 10 parts by weight of sulfite pulp waste lye as pelletizer and the resultant mixture was sufficiently agitated and then pelletized by using a desk pelletizer and spraying a small quantity of water into pellets 0.5 millimeter in diameter and 0.5 millimeter in thickness. The pellets thus prepared were carbonized in a rotary kiln at 600° C for 3 hours to obtain a carbonaceous granular molecular sieve with a yield of 80 percent.

Adsorption capacity of the molecular sieve thus obtained and a commercially available comparison molecular sieve (Molecular sieve 10×) with respect to carbon dioxide and 1,3,5-trimethylbenzene (with the minimum molecular diameter of 9.0 A) was measured at 25° C and under different pressures. Neither of these products displayed any adsorption capacity with respect to 1,3,5-trimethylbenzene, while their adsorption capacity with respect to carbon dioxide was as shown in Table 4 below.

Table 4

| Pressure (mm Hg) | Absorptin capacity (in mg/g) with respect to $CO_2$ | |
|---|---|---|
| | Molecular sieve present invention | Molecular sieve commercially available |
| 20 | 14 | 20 |
| 100 | 25 | 53 |
| 200 | 40 | 71 |
| 300 | 50 | 75 |
| 400 | 58 | 80 |
| 500 | 64 | 84 |
| 600 | 72 | 86 |
| 700 | 77 | 88 |

What is claimed is:

1. A method of manufacturing carbonaceous granular molecular sieves having a pore diameter in the range of about 3–10 A comprising the steps of subjecting a vinylidene chloride copolymer to a thermal carbonization treatment for removal of hydrogen chloride gas, cooling and pulverizing the resultant product to a grain size smaller than 100 mesh, admixing per 100 parts of said pulverized product 15 to 35 parts of a carbonaceous sintering agent and 8 to 15 parts of an organic pelletizing binder generating gas upon heating, pelletizing the resultant mixture and carbonizing the resultant pellets without activation at a temperature ranging from 400° C to 900° C for a period ranging from 2 to 6 hours, all parts being by weight.

2. A method according to claim 1, wherein said vinylidene chloride copolymer is vinylidene chloride-vinyl chloride copolymer.

3. A method according to claim 1, wherein said carbonaceous sintering agent is coal tar pitch or coking coal.

4. A method according to claim 1, wherein said pelletizer is crystalline cellulose or sulfite waste liqour.

5. A product obtainable by the method according to claim 1.

* * * * *